(12) United States Patent
Eckelt

(10) Patent No.: US 10,286,632 B2
(45) Date of Patent: May 14, 2019

(54) WALK-ON LAMINATED SAFETY GLASS PANE HAVING AN ANTI-SLIP SURFACE

(71) Applicant: SAINT-GOBAIN GLASS FRANCE, Courbevoie (FR)

(72) Inventor: Christian Eckelt, Steyr (AT)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 29 days.

(21) Appl. No.: 15/326,462

(22) PCT Filed: Oct. 14, 2015

(86) PCT No.: PCT/EP2015/073741
§ 371 (c)(1),
(2) Date: Jan. 13, 2017

(87) PCT Pub. No.: WO2016/066423
PCT Pub. Date: May 6, 2016

(65) Prior Publication Data
US 2017/0259532 A1 Sep. 14, 2017

(30) Foreign Application Priority Data
Oct. 28, 2014 (EP) .................................. 14190620

(51) Int. Cl.
*B32B 17/10* (2006.01)
*E04F 15/02* (2006.01)
(Continued)

(52) U.S. Cl.
CPC .. *B32B 17/10302* (2013.01); *B32B 17/10036* (2013.01); *B32B 17/10045* (2013.01);
(Continued)

(58) Field of Classification Search
CPC ...... E04B 5/46; E04F 15/02172; E04F 15/08; B32B 17/10; B32B 2250/02;
(Continued)

(56) References Cited

U.S. PATENT DOCUMENTS

2003/0152780 A1 8/2003 Baumann et al.
2004/0006939 A1* 1/2004 Jobs .................. B32B 17/10009
52/235

(Continued)

FOREIGN PATENT DOCUMENTS

CN 103874578 A 6/2014
DE 4210924 A1 10/1993
(Continued)

OTHER PUBLICATIONS

Written Opinion for PCT/EP2015/073741 filed on behalf of Saint-Gobain Glass France, dated Jan. 7, 2016. 10 pages (English translation + German Original).

(Continued)

*Primary Examiner* — Thao T Tran
(74) *Attorney, Agent, or Firm* — Steinfl + Bruno, LLP

(57) ABSTRACT

A walk-on laminated safety glass pane having an anti-slip surface is described. The laminated safety glass pane includes at least two glass panes, which are permanently bonded to each other using a polymeric layer.
A polymeric intermediate layer is applied to one surface of the laminated safety glass pane.
A glass pane having an anti-slip surface is applied to the polymeric intermediate layer.
An elastic polymeric gasket is inserted circumferentially in the edge region of the polymeric intermediate layer.
The laminated safety glass pane has a drilled hole and the drilled hole is sealed at subatmospheric pressure.

16 Claims, 5 Drawing Sheets

Figure 1:
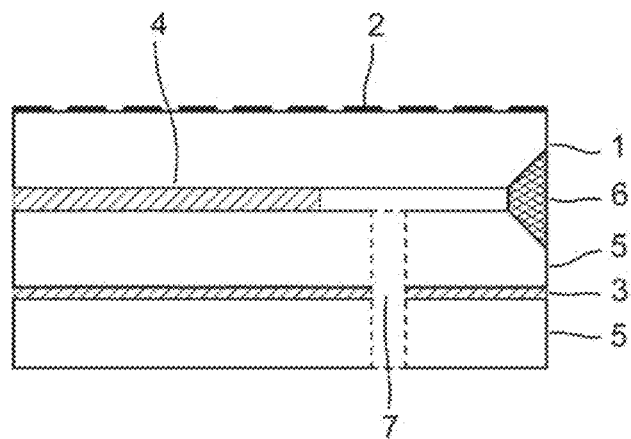

(51) Int. Cl.
*E04F 15/08* (2006.01)
*E04B 5/46* (2006.01)

(52) U.S. Cl.
CPC .... *B32B 17/1077* (2013.01); *B32B 17/10091* (2013.01); *B32B 17/10137* (2013.01); *B32B 17/10146* (2013.01); *B32B 17/10293* (2013.01); *B32B 17/10761* (2013.01); *B32B 17/10788* (2013.01); *B32B 17/10798* (2013.01); *B32B 17/10972* (2013.01); *E04B 5/46* (2013.01); *E04F 15/02172* (2013.01); *E04F 15/08* (2013.01); *B32B 2250/02* (2013.01); *B32B 2255/26* (2013.01); *B32B 2255/28* (2013.01); *B32B 2307/412* (2013.01); *B32B 2315/08* (2013.01); *B32B 2329/06* (2013.01); *B32B 2383/00* (2013.01); *B32B 2419/00* (2013.01); *B32B 2471/00* (2013.01)

(58) Field of Classification Search
CPC ............ B32B 2255/26; B32B 2255/28; B32B 2307/412; B32B 2315/08; B32B 2329/06; B32B 2383/00; B32B 2429/00; B32B 2471/00
USPC ...................................... 428/426, 425.6, 441
See application file for complete search history.

(56) References Cited

U.S. PATENT DOCUMENTS

| | | | |
|---|---|---|---|
| 2004/0067343 A1* | 4/2004 | Beteille | B32B 17/10036 |
| | | | 428/192 |
| 2005/0132558 A1* | 6/2005 | Hennessy | E06B 3/677 |
| | | | 29/525 |
| 2009/0110866 A1* | 4/2009 | Ainz | B32B 17/10055 |
| | | | 428/53 |
| 2015/0132558 A1* | 5/2015 | Iwasaki | C09J 201/00 |
| | | | 428/215 |
| 2015/0158277 A1 | 6/2015 | Fisher et al. | |
| 2015/0236491 A1 | 8/2015 | Bureloux et al. | |

FOREIGN PATENT DOCUMENTS

| | | |
|---|---|---|
| DE | 4228445 A1 | 5/1994 |
| DE | 19629241 C1 | 12/1997 |
| DE | 10003404 A1 | 8/2000 |
| DE | 10016485 A1 | 10/2001 |
| DE | 102006040007 B3 | 5/2008 |
| EP | 0513707 B2 | 1/1999 |
| GB | 1292905 A | 10/1972 |
| JP | 2002265235 A | 9/2002 |
| JP | 3094938 U | 7/2003 |
| JP | 2004316355 A | 11/2004 |
| JP | 2010126928 A | 6/2010 |
| JP | 2015526367 A | 9/2015 |
| WO | 2013/188489 A1 | 12/2013 |
| WO | 2014/057224 A1 | 4/2014 |

OTHER PUBLICATIONS

International Search Report for PCT/EP2015/073741 filed on behalf of Saint-Gobain Glass France, dated Jan. 7, 2016. 4 pages German original + English translation.

Chinese First Office Action for Chinese Application No. 201580058976.7, filed Oct. 14, 2015, on behalf of Saint-Gobain Glass France dated Sep. 3, 2018. 10 pages. (English translation only).

* cited by examiner

WALK-ON LAMINATED SAFETY GLASS PANE HAVING AN ANTI-SLIP SURFACE

CROSS REFERENCE TO RELATED APPLICATIONS

The present application is the U.S. national stage entry of International Patent Application No. PCT/EP2015/073741, filed internationally on Oct. 14, 2015, which, in turn, claims priority to European Patent Application No. 14190620.6, filed on Oct. 28, 2014.

The invention relates to a new walk-on laminated safety glass pane with an anti-slip surface and a method for production thereof.

In the construction and architectural sector, glass panels offer protection against environmental influences and keep the heat in the room. Glass panels serve substantially for illumination of rooms with natural light and enable visual contact with the environment. Glazings can, in various applications, be accessible for walking during repair work, walkable as floors, or drivable for motor vehicles. For the glass surface for these applications to be slip-proof, it is designed with an anti-slip surface.

From EP 0513707 B2, a walk-on glass plate with an anti-slip surface coating applied is known. The surface coating is a glass frit containing sharp-edged particles applied and fired on a glass surface. The sharp-edged particle content is 5% to 30% of the coating with an average with an average grain size of the particles of 50 μm and a maximum grain size of 250 μm. The particles are preferably made of silicates or metal oxides including mixtures thereof, and/or silicon oxide or sand grains.

From DE 100 03 404 A1, a floor panel is known with a surface coating made of glass or ceramic with a carrier layer, in which spherical particles of glass or ceramic are embedded. The particles protrude at least partially from the carrier layer, with the thickness of the carrier layer being greater than or equal to one half of an average diameter of the spherical particles. Due to the substantially smooth rounded surface of the particles, the risk of injury is supposed to be reduced and the capability of cleaning the floor panel is supposed to be improved. Moreover, the particles are supposed to be particularly wear-resistant since they have no edges and surface roughness that can readily wear out under load.

From DE 196 29 241 C1, another panel with an anti-slip surface coating is known. There, a glass cover pane for a recessed ground floodlight with a slip-resistant surface is described, wherein the hard particles as abrasive material made of corundum, zirconium oxide, silicon carbide, boron nitride, diamond, or titanium powder are embedded in a carrier layer and protrude above its average height. Such a slip-resistant surface has the disadvantage that in everyday use it quickly loses its anti-slip properties, since the angular particles wear out relatively quickly.

From DE 100 16 485 A1, a glass substrate with a hydrophobic surface structure is known, which has a layer made of a glass flux and structure-forming particles made preferably of oxides and silicates. The glass substrate can be used as a self-cleaning design element in the construction sector, for example, as roofing tiles, clinker, and floor tiles.

From DE 42 28 445 A1 a glass pane is known, which is used as a floor covering or as a self-supporting walk-on floor and which bears a coating of a glaze with embedded granular glass particles made, in particular, of lead borosilicate glass.

From DE 102006040007 B3, a walk-on glass element with a glass pane and with a surface coating applied to the glass pane is known, which is made of a fired glass frit containing sharp-edged particles, wherein the content by weight of the sharp-edged particles is 5% to 30%, and the particles have a size between 50 μm and 250 μm with an average grain size of 100 μm, wherein the sharp-edged particles are made of glass ceramic.

Walk-on laminated safety glass panes with an anti-slip surface are constructed from at least two panes, wherein the uppermost glass pane serves as a protective pane and the glasses situated therebelow fulfill the load-bearing function. In order to absorb higher stresses and to achieve appropriate safety, such panes are made, overall, of three or more panes that are permanently bonded to one another by polymeric layers.

The anti-slip surface has the disadvantage that it is worn out after a certain useful life and the anti-slip effect diminishes significantly. Consequently, a worn anti-slip surface must be exchanged for a laminated safety glass pane with an anti-slip surface. The exchange of the laminated safety glass pane with a worn-out, anti-slip surface is very laborious and expensive since the entire laminated safety glass pane must be exchanged.

The existing glazings below the anti-slip glass pane are still fully functional after the wearing out of the anti-slip surfaces. However, they can be separated from the worn-out glass pane only with great expense. This expense is in no way comparable to a new glazing, which, already as a new product, is subject to very high production costs.

The object of the invention is to provide a new walk-on laminated security glass pane having an anti-slip surface, with which the entire glazing need not be replaced after the wearing out of the anti-slip surface layer. The invention has the further object of providing an economical and environmentally responsible method with which the worn-out anti-slip surface is exchanged without exchanging the entire laminated safety glass pane in the process. The invention has the further object of providing an economical use for the walk-on laminated safety glass pane having an anti-slip surface.

The object of the invention is accomplished according to the invention by a walk-on laminated safety glass plane having an anti-slip surface with the characteristics of claim 1. The invention is further accomplished by the characteristics of claims 13 and 15. Advantageous embodiments emerge from the subclaims.

The object of the invention is, consequently, accomplished according to the invention by a walk-on laminated safety glass pane having an anti-slip surface, comprising at least two glass panes, which are permanently bonded to each other using a polymeric layer to form a laminated safety glass pane, wherein a polymeric intermediate layer is applied to one surface of the laminated safety glass pane, a glass pane having an anti-slip surface is applied to the polymeric intermediate layer, an elastic polymeric gasket is inserted circumferentially in the edge region of the polymeric intermediate layer, the laminated safety glass pane has a drilled hole, and the drilled hole is sealed at subatmospheric pressure.

A walk-on laminated safety glass pane having an anti-slip surface is constructed from at least three panes, with the uppermost glass pane serving as a protective pane and the glass panes that are situated therebelow fulfill the load-bearing function. The uppermost glass pane has, due to accident prevention regulations, an anti-slip surface. The slipping and accident risk is significantly reduced by means of the roughened surface. The glass pane with an anti-slip surface is also referred to in the following as an "anti-slip glass pane".

The uppermost glass pane is customarily made of single-pane safety glass. The uppermost glass pane protects the statically load-bearing panes against shock-type loads and damage and is provided with a rough surface. The load-bearing glass unit made of additional individual panes customarily consists of a laminated safety glass pane. The laminated safety glass pane includes at least two panes and one polymeric layer, which permanently bonds two panes to one another. The glass panes are permanently bonded to one another such that in the case of glass breakage of the glazing, the falling off of fragments as well as the breaking through of individuals and objects is prevented.

In order to separate the anti-slip glass pane from the glass panes situated therebelow, the present invention enables a very advantageous reusable bonding technique between the glass pane with the anti-slip surface and the laminated safety glass pane.

The glass pane with an anti-slip surface can be a monolithic pane, which is then preferably prestressed; however, it is equally possible to produce a laminated glass panel from one glass pane and additional glass or plastic panels, or panels of a different material, for example, steel or ceramic. The individual panels are then bonded to each other using adhesive layers, for example, in the form of thermoplastic films or hardening liquids, with the useful side provided with the surface coating naturally facing outward. Films made of polyvinyl butyral have proven their worth as adhesive layers.

A preferred embodiment of the invention is a walk-on laminated safety glass pane with an anti-slip surface, wherein the polymeric layer of the laminated safety pane includes at least one of the polymeric films polyvinyl butyral (PVB), ethyl vinyl acetate (EVA), polyurethane (PU) in particular with a thickness of 0.76 mm to 1.6 mm. These polymers have proven to be particularly suitable. The range for the thickness is particularly advantageous.

A preferred embodiment of the invention is a walk-on laminated safety glass pane with an anti-slip surface, wherein the glass panes of the laminated safety glass pane have a thickness of 8 mm to 25 mm. The range for the thickness of the panes is particularly advantageous for the stability of the laminated safety pane.

A preferred embodiment of the invention is a walk-on laminated safety glass pane with an anti-slip surface, wherein the polymeric intermediate layer between the anti-slip glass pane and the laminated safety glass pane contains at least one of the polymeric films polyvinyl butyral (PVB), ethyl vinyl acetate (EVA), polyurethane (PU), or polyvinyl chloride (PVC), in particular with a thickness of 0.5 mm to 2.0 mm. These polymers have shown themselves to be particularly suitable. This range for the thickness of the polymeric films is particularly advantageous. Between the upper anti-slip glazing and the lower laminated safety glass pane is laid a clear, transparent, or opaque intermediate layer that ensures a distancing so no damaging of the glass panes among themselves occurs.

A preferred embodiment of the invention is a walk-on laminated safety glass pane with an anti-slip surface, wherein the glass pane with an anti-slip surface is thermally or chemically prestressed or partially prestressed and has a thickness of 6.0 mm to 12.0 mm. The range for the thickness is particularly advantageous for the panes of the laminated safety pane.

A preferred embodiment of the invention is a walk-on laminated safety glass pane with an anti-slip surface, wherein the anti-slip surface is a surface coating applied to the glass pane.

A preferred embodiment of the invention is a walk-on laminated safety glass pane with an anti-slip surface, wherein the anti-slip surface coating is applied by roughening with sandblasting, by etching with acid, by screen printing, in particular with anti-slip enamel, or by laser patterning. Depending on the desired structure, the thickness of the printing can differ and vary by the degree of the anti-slip effect. The glass pane with an anti-slip surface is advantageously covered, at least in regions, and preferably forms a predetermined pattern.

The surface coating be produced both colorless and also colored translucent or opaque in various colors. The color effects can be achieved by colored glass frits or the surface coating or pigments admixed with the ceramic paste.

The layer applied will usually cover the usable area, i.e., the surface to be walked on of the glass element, over its entire surface, since such a continuous coating is relatively simple to produce. However, the surface coating can also be applied in specific regular or irregular patterns, by which means particularly aesthetic effects can be achieved. The patterns can also consist of differently colored surface coatings.

A preferred embodiment of the invention is a walk-on laminated security glass pane with an anti-slip surface, wherein the circumferential elastic polymeric gasket contains polymers such as silicone rubber, polyurethanes, butyl rubber, and/or polyacrylates. The glass edge between the laminated safety glass pane and the glass pane with an anti-slip surface is shaped such that an elastic gasket on the glass edges enables a durable airtight connection. The glass edge shape is formed such that the gasket can be implemented flush. The possibility further exists of extruding vanes on this gasket that permit a pressure-resistant barrier for the subsequent sealing with elastic sealants. The vanes can also be implemented from a harder elastomer, by which means an elastomer profile with volume geometries of different hardnesses is obtained. The vanes can be designed such that they enable durable sealing.

A preferred embodiment of the invention is a walk-on laminated security glass pane with an anti-slip surface, wherein the circumferential elastic polymeric gasket is a silicone profile.

A preferred embodiment of the invention is a walk-on laminated security glass pane having an anti-slip surface, wherein the elastic polymeric gasket has protrusions. The protrusions advantageously protect the edges of the laminated security glass pane with an anti-slip surface, since they prevent direct contact of the glass edge with the transport frames. The protrusions are also advantageous when laminated safety glass panes with an anti-slip surface are set next to each other as modules, for example, in the flooring sector. A spacer is thus obtained and the direct contact of the edges of the modules is prevented.

A preferred embodiment of the invention is a walk-on laminated security glass pane with an anti-slip surface, wherein the drilled hole has a diameter of 5 mm to 8 mm. This diameter range has proven particularly effective during application of subatmospheric pressure as well as closing and depressurizing of the valve.

A preferred embodiment of the invention is a walk-on laminated security glass pane with an anti-slip surface, wherein the drilled hole is sealed at subatmospheric pressure with a valve. A valve suitable for the subatmospheric pressure has proven very effective.

The elastic gasket is held against the glass edge by subatmospheric pressure. The subatmospheric pressure is produced durably by means of the valve that is incorporated into the lower glass unit. To that end, a drilled hole is provided in the lower glass panes, into which hole the valve is durably embedded air-tightly.

The object of the present invention is further accomplished by a method for producing a walk-on laminated safety glass pane having an anti-slip surface, wherein
a) a polymeric intermediate layer is applied to one surface of a laminated safety glass pane with a drilled hole,
b) a circumferential elastic polymeric gasket is placed in the edge region of the polymeric intermediate layer,
c) a glass pane having an anti-slip surface is placed on the polymeric intermediate layer fitting into the circumferential elastic polymeric gasket,
d) subatmospheric pressure is applied through the drilled hole in the laminated safety glass pane, and
e) the drilled hole is sealed at subatmospheric pressure.

A preferred embodiment of the invention is a method, wherein the drilled hole is sealed at subatmospheric pressure with a valve. A valve can be used reliably and cleanly multiple times.

To exchange the glass pane, the valve is depressurized and the subatmospheric pressure released. Then, the worn-out upper anti-slip glass pane can be exchanged. Thereafter, a subatmospheric pressure is generated, by which means a durable connection of the glass elements among each other is again ensured. Finally, the valve is closed and the subatmospheric pressure maintained.

The object of the present invention is further accomplished by the use of the walk-on laminated safety glass pane with an anti-slip surface for glass floors, platforms, stair steps, light cutouts, and bridge glazings.

Another preferred embodiment of the invention is a laminated security glass pane with an anti-slip surface wherein the upper glass pane with an anti-slip surface is held together with the laminated safety glass pane under adhesive forces. In that case, adhesive force is used instead of or in addition to subatmospheric pressure. For this, a minimal amount of liquid between the glass panels suffices to generate a strong adhesion against tensile force. Water is preferred as the liquid. For anti-slip floors, in particular, outdoors, polyethylene glycol is preferred as the liquid. Polyethylene glycol is frostproof to −30° C. for PEG200 and non-toxic.

Retaining clips or an edging, in particular a U-profile made of a flexible material, which additionally serves as a gasket, are suitable for preventing horizontal displacement of the uppermost pane.

When water is used as the liquid, a shallow trough is filled with water and the panes connected at a slight at a slightly inclined position below the surface of the water so that air bubbles escape more easily. The liquid can also be applied in the center of the pane. The upper pane is applied and pressed evenly so that entrapped air bubbles escape.

The invention is explained in detail in the following with reference to drawings.

They depict:

FIG. 1: A cross-section of a walk-on laminated safety glass pane with an anti-slip surface according to the invention with an unsealed drilled hole, FIG. 2: A cross-section of a walk-on laminated safety glass pane with an anti-slip surface according to the invention, wherein the drilled hole is sealed at subatmospheric pressure with a valve, FIG. 3: A bottom plan view of a walk-on laminated safety glass pane with an anti-slip surface according to the invention, FIG. 4a: A cross-section of a walk-on laminated safety glass pane with an anti-slip surface according to the invention with a preferred embodiment of an elastic seal in the region of the edges, FIG. 4b: A cross-section of a walk-on laminated safety glass pane with an anti-slip surface according to the invention with a preferred embodiment of an elastic seal in the region of the edges, FIG. 5: A spherical view of a circumferential elastic polymeric gasket as a profile with protrusions, FIG. 6: A cross-section of a walk-on laminated safety glass pane with an anti-slip surface according to the prior art, FIG. 7: A top plan view of a walk-on laminated safety glass pane with an anti-slip surface according to the invention wherein the polymeric intermediate layer is mounted only partially congruently under a partially applied anti-slip surface instead of on the full surface, and FIG. 8: A cross-section of a walk-on laminated safety glass pane with an anti-slip surface according to the invention of FIG. 7.

FIG. 1 depicts, in cross-section, a walk-on laminated safety glass pane with an anti-slip surface according to the invention with an unsealed drilled hole, consequently, in the depressurized state. For this, a laminated safety glass pane 5 made of at least two 20.0-mm-thick glass panes is produced. For this, the glass panes are laminated with a PVB film 3 with a thickness of 0.76 mm or 1.52 mm. Thereafter, a drilled hole 7 is made in the laminated safety glass pane 5. A polymeric film 4 with a thickness of 1.52 mm is placed on one glass surface of the laminated safety glass pane 5. A silicone profile as an elastic polymeric gasket 6 is inserted circumferentially in the edge region of the polymeric film 4. A glass pane 1 with a thickness of 12.0 mm with an anti-slip surface 2 is placed on the polymeric film 4 such that the anti-slip surface 2 faces upward. The anti-slip surface 2 was applied by screen printing on the surface of the glass pane 1.

Figure 2:
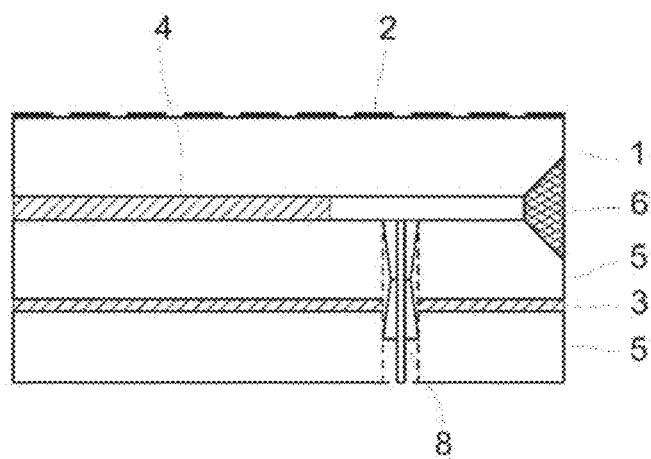

FIG. 2 depicts, in cross-section, a walk-on laminated safety glass pane with an anti-slip surface according to the invention with a sealed drilled hole, consequently, with subatmospheric pressure applied. For this, a subatmospheric pressure is applied on the laminated safety glass pane 5 through the drilled hole 7. Then, a valve 8 situated in the drilled hole 7 is closed at subatmospheric pressure. The subatmospheric pressure holds the upper pane 1 permanently bonded to the laminated safety pane 5 via the intermediate layer 4.

FIG. 1 and FIG. 2 show that the pane of the laminated safety glass pane 5 adjacent the intermediate layer 4 and the pane 1 preferably have recesses in the edge region, which recesses enable the positioning of the circumferential elastic polymeric gasket 6.

Figure 3:
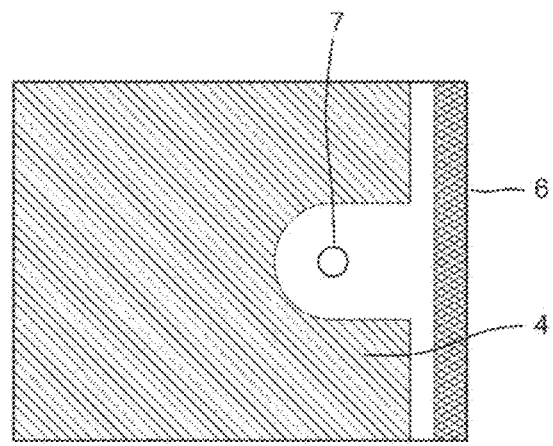

FIG. 3 depicts, as a bottom plan view, a walk-on laminated safety glass pane with an anti-slip surface according to the invention. It depicts how the drilled hole 7 is drilled and how the intermediate layer 4 is positioned. Also depicted is how the circumferential elastic polymeric gasket 6 is inserted.

Figure 4A:
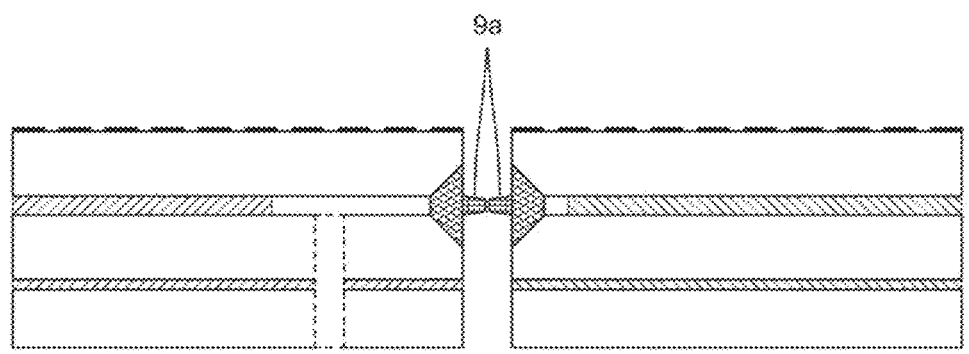
Figure 4B:
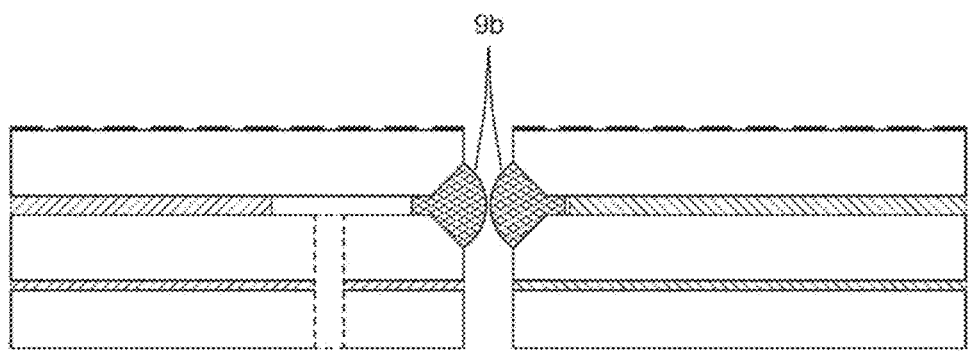

FIG. 4a and FIG. 4b depict, in cross-section, two walk-on laminated safety glass panes according to the invention with an anti-slip surface positioned next to each other with a preferred embodiment of an elastic seal 6 in the region of the edges. The elastic seal 6 has protrusions 9a and 9b. The protrusions 9a and 9b protect the edges of the laminated safety glass panes with an anti-slip surface during transport and during placement next to one another in the flooring sector. They also represent a spacer. The protrusions 9a and 9b differ in the embodiment. The protrusions 9a are tapered decreasing outward. The protrusions 9b are curved outward.

Figure 5:
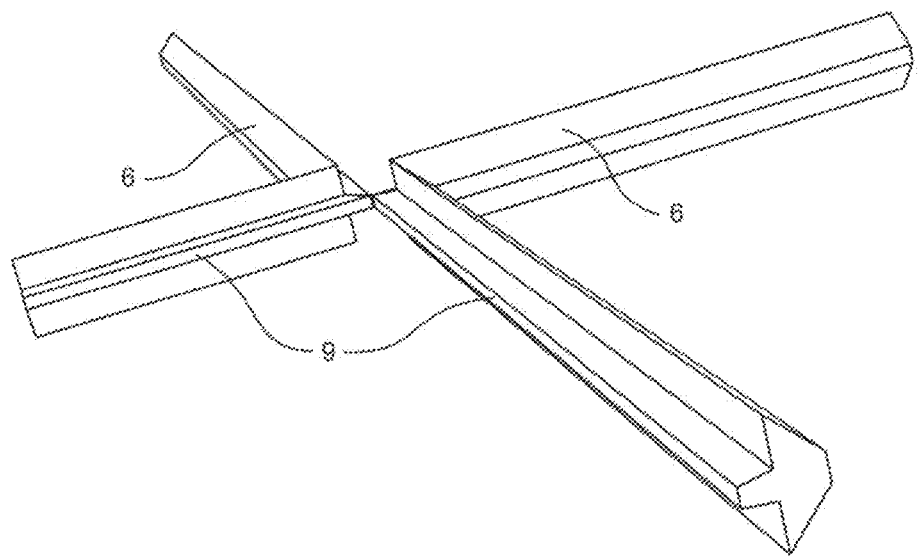

FIG. 5 depicts, in a spherical view, the circumferential elastic polymeric gasket 6 as a profile, in particular as a silicone profile. A profile variant 6 with outwardly decreasing tapered protrusions 9 is depicted. The use of profiles as an elastic polymeric gasket 6 has proven itself.

Figure 6:
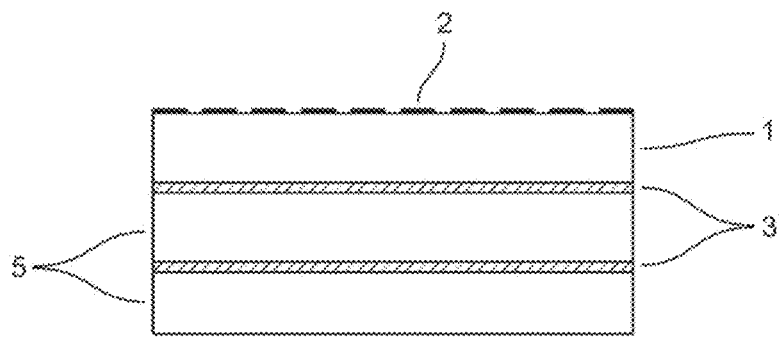

FIG. 6 depicts a walk-on laminated safety glass pane with an anti-slip surface according to the prior art. It is shown that the uppermost anti-slip glass pane is permanently bonded to the load-bearing panes positioned thereunder. An exchange of the upper pane is no longer possible. The entire laminated safety glass pane with an anti-slip surface must be exchanged in the event of repair. Replacement of the uppermost pane is not possible without disassembling the complete structure. Replacement is necessary in the event of breakage or wear or when a new design is desired.

Figure 7:
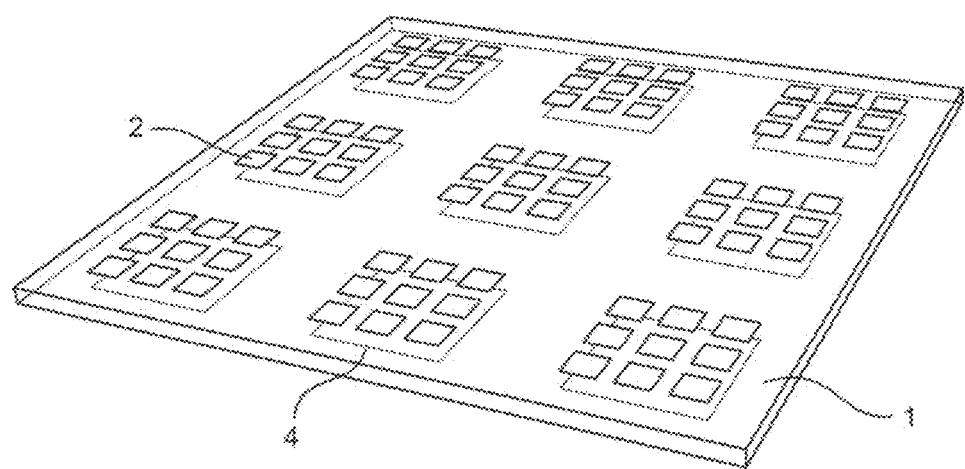
Figure 8:
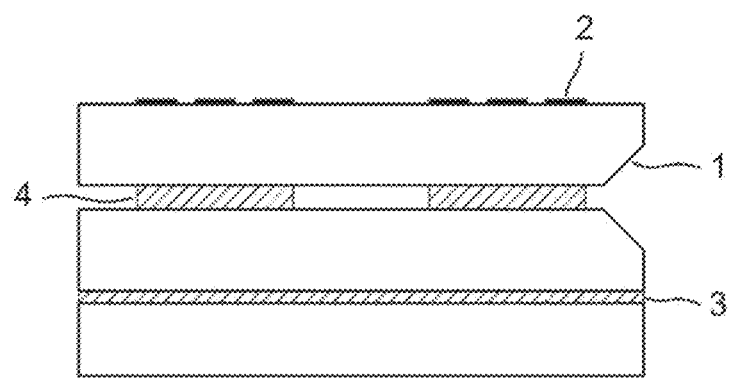

FIG. 7 and in FIG. 8 depict that the polymeric intermediate layer 4 is mounted only partially and almost congruently under a partially applied anti-slip surface 2 instead of on the full surface. For the sake of clarity, the circumferential polymeric gasket 6 and the drilled hole 7 are not shown.

LIST OF REFERENCE CHARACTERS 1 uppermost glass pane/anti-slip glass pane single-pane safety glass/protective glass
2 anti-slip surfaces
3 polymeric layers for permanent bonding/laminating of glass panes of a laminated safety glass pane
4 clear, transparent, or opaque intermediate layer/polymeric film
5 laminated safety glass pane/load-bearing glass panes
6 elastic polymeric gasket
7 drilled holes in the laminated safety glass pane
8 valve for sealing the subatmospheric pressure between the anti-slip glass pane and the laminated safety glass pane
9 protrusions of the elastic polymeric gasket (6)

The invention claimed is:

1. A walk-on laminated safety glass pane having an anti-slip surface, comprising:
   a first glass pane and a second glass pane that are permanently bonded to each other through a polymeric layer to form a laminated safety glass pane;
   a polymeric intermediate layer applied to one surface of the laminated safety glass pane;
   a third glass pane having an anti-slip surface, the third glass pane being applied to the polymeric intermediate layer; and
   an elastic polymeric gasket inserted circumferentially in an edge region of the polymeric intermediate layer,
   wherein the laminated safety glass pane has a drilled hole sealed at subatmospheric pressure with a valve within the drilled hole.

2. The walk-on laminated safety glass pane according to claim 1, wherein the polymeric layer contains at least one of the polymeric films polyvinyl butyral (PVB), ethyl vinyl acetate (EVA), and polyurethane (PU) with a thickness of 0.76 mm to 1.6 mm.

3. The walk-on laminated safety glass pane according to claim 1, wherein the first glass pane and the second glass pane each have a thickness of 8 mm to 25 mm.

4. The walk-on laminated safety glass pane according to claim 1, wherein the polymeric intermediate layer contains at least one of the polymeric films polyvinyl butyral (PVB), ethyl vinyl acetate (EVA), polyurethane (PU), and polyvinyl chloride (PVC) with a thickness of 0.5 mm to 2.0 mm.

5. The walk-on laminated safety glass pane according to claim 1, wherein the polymeric intermediate layer is located under the anti-slip surface in an at least partial longitudinal correspondence with the anti-slip surface.

6. The walk-on laminated safety glass pane according to claim 5, wherein the polymeric intermediate layer is in full longitudinal correspondence with the anti-slip surface.

7. The walk-on laminated safety glass pane according to claim 1, wherein the third glass pane is thermally or chemically prestressed or partially prestressed and has a thickness of 6.0 mm to 12.0 mm.

8. The walk-on laminated safety glass pane according to claim 1, wherein the anti-slip surface is a surface coating applied to the third glass pane.

9. The walk-on laminated safety glass pane according to claim 8, wherein the surface coating covers the third glass pane at least in regions of the third glass pane.

10. The walk-on laminated safety glass pane according to claim 8, wherein the surface coating forms a predetermined pattern of the third glass pane.

11. The walk-on laminated safety glass pane according to claim 1, wherein the circumferential elastic polymeric contains one or more of silicone rubber, polyurethanes, butyl rubber, and polyacrylates.

12. The walk-on laminated safety glass pane according to claim 1, wherein the elastic polymeric gasket is a silicone profile.

13. The walk-on laminated safety glass pane according to claim 1, wherein the elastic polymeric gasket has protrusions.

14. The walk-on laminated safety glass pane according to claim 1, wherein the drilled hole has a diameter of 5 mm to 8 mm.

15. An arrangement comprising the walk-on laminated glass safety pane of claim 1, the arrangement being selected from the group consisting of: a glass floor, a platform, a stair step, a light cutout, and a bridge glazing.

16. A method for producing a walk-on laminated safety glass pane, comprising:
   providing a first glass pane and a second glass pane that are permanently bonded to each other through a polymeric layer to form a laminated safety glass pane, wherein the laminated safety glass pane has a drilled hole;
   applying a polymeric intermediate layer to one surface of the laminated safety glass pane;
   placing a circumferential elastic polymeric gasket in an edge region of the polymeric intermediate layer;
   placing a third glass pane having an anti-slip surface on the polymeric intermediate layer so as to fit into the circumferential elastic polymeric gasket;
   applying subatmospheric pressure through the drilled hole in the laminated safety glass pane; and
   sealing the drilled hole at subatmospheric pressure with a valve within the drilled hole.

* * * * *